Sept. 30, 1947.　　　　H. M. DUSTIN　　　　2,428,206
CARRIAGE POSITION CONTROL MECHANISM
Filed Aug. 4, 1941　　　4 Sheets-Sheet 1

FIG_1_

INVENTOR.
HOWARD M. DUSTIN
BY Naylor and Lassagne
ATTORNEYS

Sept. 30, 1947. H. M. DUSTIN 2,428,206
CARRIAGE POSITION CONTROL MECHANISM
Filed Aug. 4, 1941 4 Sheets-Sheet 2

INVENTOR.
HOWARD M. DUSTIN
BY *Naylor and Lassagne*
ATTORNEYS

Sept. 30, 1947. H. M. DUSTIN 2,428,206
CARRIAGE POSITION CONTROL MECHANISM
Filed Aug. 4, 1941 4 Sheets-Sheet 3

INVENTOR.
HOWARD M. DUSTIN
BY
ATTORNEYS

Sept. 30, 1947.  H. M. DUSTIN  2,428,206
CARRIAGE POSITION CONTROL MECHANISM
Filed Aug. 4, 1941  4 Sheets-Sheet 4

INVENTOR.
HOWARD M. DUSTIN
BY *Taylor and Lassagne*
ATTORNEYS

Patented Sept. 30, 1947

2,428,206

UNITED STATES PATENT OFFICE 2,428,206

CARRIAGE POSITION CONTROL MECHANISM

Howard M. Dustin, Oakland, Calif., assignor to Marchant Calculating Machine Company, a corporation of California Application August 4, 1941, Serial No. 405,304

15 Claims. (Cl. 235—63)

The present invention relates to calculating machines and the like having a shiftable carriage, and has particular reference to a control means for controlling carriage return to a selected one of a series of different positions.

This invention is disclosed as embodied in a commercially known Marchant calculating machine of the type shown in the Avery Patent Number 2,216,659 of October 1, 1940, to which reference is hereby made for a disclosure of the complete calculating machine, including mechanisms not specifically disclosed herein. It is to be understood, however, that the invention may also be applied to other types of machines such as typewriters, and to other types of calculating machines, for example, those in which the registers are held stationary and the actuators or devices connecting the actuators to the registers are shifted.

The general object of the present invention is to control the return of carriage of a machine of this general class, to a selected one of a series of different positions.

Another object is to enable successive depressions of a shift initiating key to successively control shifting of a carriage to different predetermined positions.

Another object is to render a shift terminating mechanism effective to arrest a shiftable carriage at a selected carriage position only when the carriage is shifted in one direction.

Another object is to provide a simplified mechanism for arresting a shiftable carriage in any one of a series of different carriage positions.

In routine office calculations, a series of calculations of the same type are often made and certain of the factors of such calculations often contain approximately the same number of digits or, at least, the factors usually do not extend over a certain number of digits and do not utilize the full capacity of the machine.

Therefore, in using a calculating machine for certain calculations, such as multiplication and division, in which the carriage is shifted during the operation of the machine, it is common practice to start each calculation with the carriage in a certain selected intermediate position instead of an extreme end starting position so that it will finish adjacent an end position, and thereby avoid unnecessary automatic carriage shifting and, as in the case of automatically performed division, unnecessary actuation. Also, in certain cases, such as in multiplication when it is desired to accumulate multipliers or when employing certain types of decimal systems in performing multiplication or division, the carriage must be set in a predetermined position at the start of said calculation instead of merely in an end starting position.

The present invention provides a simple tabular shift stop mechanism which, upon initiation of the carriage shifting mechanism by certain shift effecting keys, arrests the carriage in a predetermined one of a series of positions. A series of ordinally spaced stops is provided on the carriage and when one of these stops is set and the carriage is shifted, the carriage will be automatically arrested in a corresponding carriage position. Two or more stops may be concurrently set, the arrangement being such that after the first depression of a certain shift effecting key the carriage will continue shifting until it reaches the first position corresponding to one of the set stops, and then upon a second depression of said key the carriage will be arrested in the next position corresponding to another of the set stops, and so on.

Thus, after completion of a machine calculation, the operator need merely depress the shift effecting key, relying on the shifting mechanism to automatically effect shifting of the carriage to the desired starting position in readiness for the next calculation. In view of the fact that calculating machines, such as of the type disclosed in connection with the present invention, may be generally arranged to enable the carriage to always be shifted in one direction throughout the performance of certain types of calculations, i. e., multiplication or division, the present tabular shift stop mechanism is arranged to become effective when the carriage is shifted in one direction only, that is, in a direction opposite to that in which the carriage normally shifts in the performance of calculations involving automatic carriage shifting.

The manner in which the above and other objects of the invention are accomplished will be readily understood on reference to the following specification when read in conjunction with the accompanying drawings, wherein.

Carriage shifting mechanism

The carriage shift controlling mechanism embodying the present invention is designed to operate in conjunction with a carriage shifting mechanism of the type used in the commercially known Marchant calculating machine and disclosed and claimed in the patent to Avery et al., Number 2,162,238, issued June 13, 1939. The construction and operation of this carriage shifting mechanism will, therefore, be first briefly described before an explanation of the novel controls constituting the present invention is given.

Figure 1:
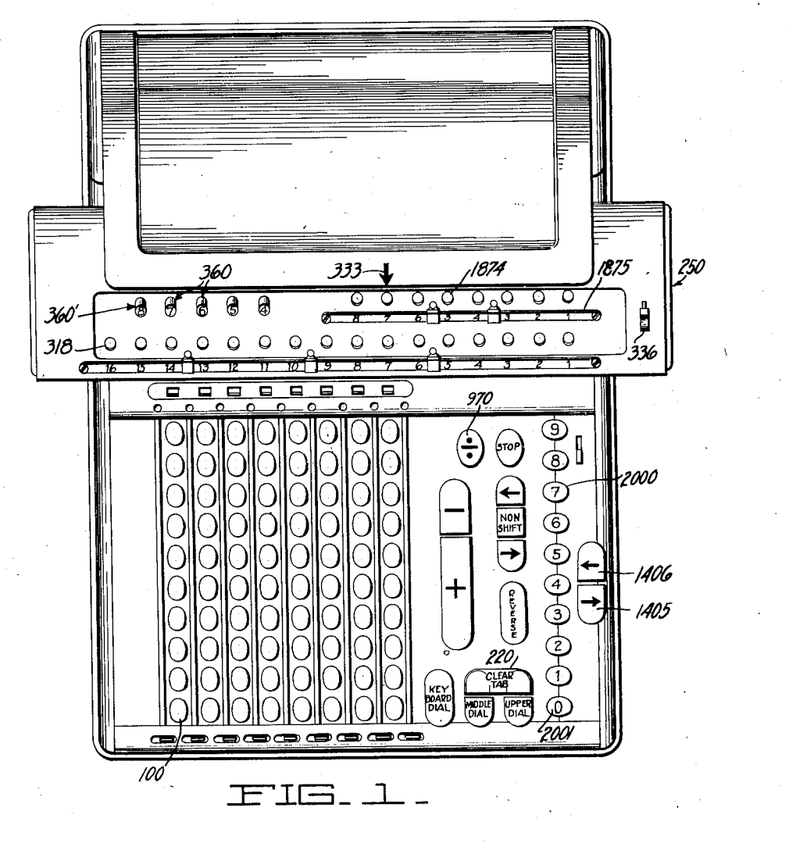
Figure 1 is a plan view of a calculating machine embodying the present invention.

The carriage 250 (Figure 1) carrying the usual accumulator and counter registers 318 and 1874, respectively, is shifted by power derived from an electric motor (not shown) under control of shift keys 1405 and 1406, or a master tabulator key 220. The carriage is also automatically shifted during multiplication and division operations performed by the machine under control of a division key 970 or any of the keys of a row of multiplier keys 2000, as disclosed in detail in the above mentioned Avery Patent Number 2,216,659.

Figures 2, 3:
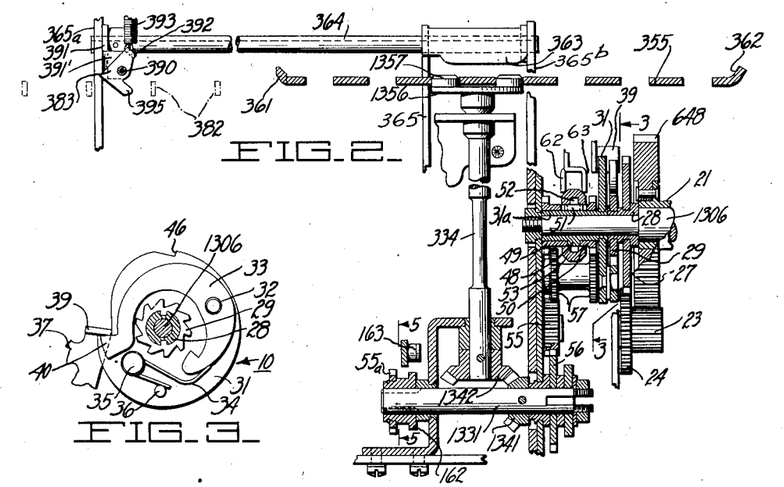
Figure 2 is an elevational view, in section, of the reversible carriage shifting mechanism, its connection with the carriage, and part of the shift terminating mechanism.
Figure 3 is a sectional view illustrating the carriage shift clutch and is taken along the line 3—3 of Figure 2.

Power is transmitted from the motor through suitable gearing to a sleeve 21 and gear 648 (Figure 2) journaled on a fixed supporting shaft 1306. The gear 648 drives a compound idler arrangement comprising gears 23 and 24, the latter meshing with a gear 27 keyed on a sleeve 28 journaled on the shaft 1306. A ratchet 29 is also keyed to the sleeve 28 and thereby forms the driving member of a ratchet type shift clutch 10 (Figure 3).

Juxtaposed with the ratchet 29 is the driven side of the clutch comprising a disc 31 which is secured to a sleeve 31a also journaled on the shaft 1306 and forming the driving element of a reversible drive transmission to be described presently. A stud 32 on the disc 31 rockably supports a clutch dog 33 adapted to engage one of a series of notches in the ratchet 29. A spring 34 mounted on a stud 35, fixed to the disc 31, is retained at one end by a stud 36 also mounted on the disc 31, the other end pressing against the dog 33 to urge the same in a clockwise direction toward engagement with the ratchet.

The clutch dog 33 is normally held out of engagement with the ratchet 29 by a clutch control dog 37 (Figures 3 and 4), pivotally mounted on a shaft 1351, and urged clockwise by a spring 38 tensioned between the machine frame and the dog 37. At the completion of a shift cycle, an ear 39 of the control dog 37 is allowed to rock into a notch formed on the periphery of the driven clutch disc 31 so as to engage the tail 40 of the clutch dog 33 and rock the same counterclockwise out of engagement with the ratchet 29. A shoulder 41 on the clutch disc 31 impinges the ear 39 thereby arresting the clutch in a definite full cycle position, and at this time a pawl 43 pivotally supported by a frame pin 144 and urged in a clockwise direction by a spring 45 falls into a notch 46 in the disc 31 preventing retrograde movement of the disc 31 due to rebound or pressure by the spring 34.

The reversing transmission comprises the sleeve 31a which is provided with an annular flange 48, on opposite sides of which are mounted independently rotatable gears 49 and 50. The flange 48 and gears 49 and 50 are slotted to receive a slidable key 51, a lug 52 of which is embraced by a circumferentially grooved annular collar 53 slidably fitted over the flange 48 and the hubs of gears 49 and 50. Thus, if the collar 53 is moved to the right or left in a manner to be described hereinafter, the key 51 will disconnect one gear 49 or 50 from the drive sleeve 31a while the other gear will remain coupled thereto. If the collar 53 is moved to the left (as viewed in Figure 2), coupling the driving sleeve 31a only with the gear 49, a drive is effected through gear 49, idler gear 55, meshing with gear 49, and driven gear 56, but if the collar 53 is shifted to the right the drive is transmitted through sleeve 31a, gear 50, reverse idler 57, and idler 55, thereby driving the driven gear 56 in the reverse direction.

The direction of rotation of the gear 56 determines the direction of the carriage shift. Gear 56 is mounted on and secured to a jack shaft 1331, on which is mounted a bevel gear 1341 meshing with a bevel gear 1342 secured to the lower end of a vertical drive shaft 334 journaled at each end in bearings provided in suitable brackets. Secured at the upper end of the shaft 334 is a disc 1356 on which are mounted rollers 1357 meshing with a rack 355 carried by the carriage.

Figures 9, 10, 11:
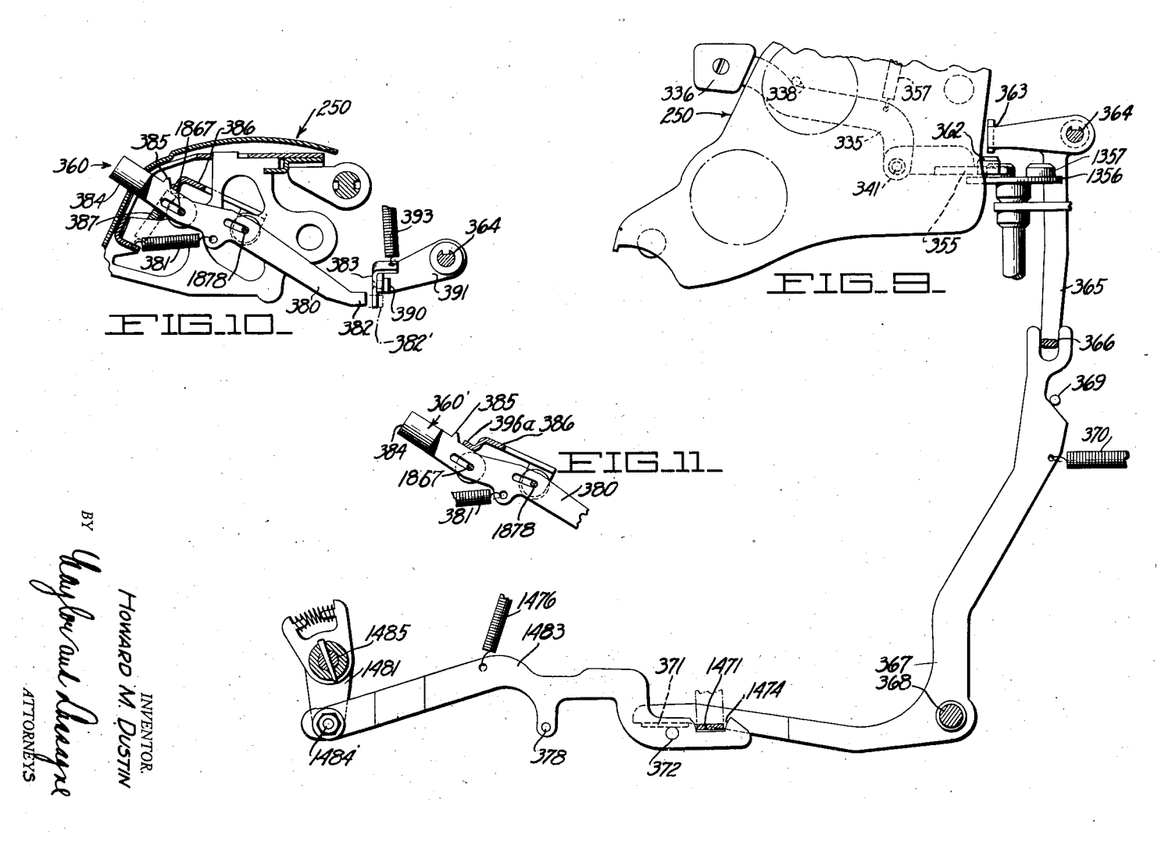
Figure 9 is a side view of the shift terminating linkage.
Figure 10 is a transverse sectional view, taken through a portion of the carriage, illustrating one of the settable stops and part of the shift terminating mechanism.
Figure 11 is a detail view of the leftmost settable stop mounted on the carriage.

As shown in Figure 9, the rack 355 is pivotally supported at 341 by the carriage frame and is normally held in mesh with the rollers 1357 by a spring 357 tensioned between the carriage frame and an arm 335 suitably secured to the rack 355. A limit pin 338 limits the clockwise rocking movement of the arm 335 and rack 355 under the urge of spring 357. The arm 335 protrudes through a slot in the carriage cover and terminates in a knob 336 whereby the rack 355 may be manually demeshed from the rollers 1357 and the carriage manually shifted to any desired position.

Control of carriage shifting mechanism by carriage shift keys

The controls for the carriage shifting clutch and reversing mechanism are operable by the shift keys 1405 and 1406 (Figures 1 and 4), and means are provided whereby the depression of one or the other of these keys will effect engagement of the clutch and will shift the collar 53 to one extreme position or the other, depending upon which key is depressed, thereby determining the direction of operation of the carriage shifting mechanism.

As explained in detail in the above mentioned Avery Patent Number 2,216,659, depression of the key 1405 will cause a control shaft 1485 to rock clockwise while depression of key 1406 will cause the shaft 1485 to rock counter-clockwise. This is effected by links 1407 and 1408 pivoted at their upper ends to the stems of shift keys 1405 and 1406, respectively, and each pivotally connected at its lower end to a pin 1409 embraced by the bifurcated end of an arm 1482 fixed on the shaft 1485, a stationary guide plate 1417 serving to guide the pin 1409 when either shift key is depressed. A spring 1410, tensioned between a frame stud and link 1408, normally maintains the shift keys 1405 and 1406 in their illustrated raised position.

Mounted upon shaft 1485 and rocked thereby is a lever 1481 pivotally connected at 1484 to a link 1483 provided with a notch 1474 which is held in a position embracing a lateral extension 1471 of a lever 1375, by a spring 1476 (Figure 9) tensioned between the machine frame and the link. The lever 1375 is pivotally supported at 1376 and is connected at its upper end to a link 1374 pivotally connected to a clutch control member 60 which constitutes a control member moveable from ineffective position to shift initiating position to cause the shifting mechanism to shift the carriage. The control member 60 is pivotally supported at 144 and is provided with a V-shaped slot 61 which embraces a stud 64 on the clutch control dog 37 so that when the control member 60 is rocked in either direction from its illustrated centralized position the clutch control dog 37 is rocked counter-clockwise about the shaft 1351 to clutch engaging position, whereupon the ear 39 (Figures 3 and 4) releases the clutch pawl 33, enabling the spring 34 to rock the same clockwise into engagement with the ratchet 29 to transmit the motor drive through the clutch 10 to the carriage.

The clutch control member 60 is also provided with two shift fingers 62 and 63, the finger 62 being disposed on the left side of the collar 53 and the finger 63 on the right side thereof (as viewed in Figure 2). It will be noted that the fingers 62 and 63 are adapted to engage opposite beveled sides of the collar 53 and, therefore, when the control member 60 is rocked counter-clockwise, as by depression of the shift key 1406, the collar 53 will be shifted to the right to effect a leftward carriage movement as explained hereinbefore. If, however, the clutch control member 60 is rocked clockwise, as by depression of the key 1405, the collar will be shifted to the left to effect a rightward carriage movement.

From the foregoing it will be readily seen that while the clutch control lever 37 is being rocked counter-clockwise, the collar 53 is concurrently conditioned for directional control of the drive effected by the unidirectional clutch 10. When the clutch is ultimately engaged, the ear 39 rides on the periphery of the clutch disc 31 and retains the clutch control member 60 in its selected position until the cycle is completed. As the disc 31 approaches a full cycle position (assuming the link 1374 is not restrained by the shift keys 1405 and 1406 or other shift controlling means to be described hereinafter) the ear 39 engages the tail 40 (Figure 3) of the clutch dog 33, rocking the same counter-clockwise to disengage the clutch. At the same time, the clutch control member 60 is moved by the stud 64 on member 37 to its illustrated centralized position, thereby shifting the collar 53 (Figure 2) into its central position.

Means are provided to centralize the driven elements of the carriage shifting mechanism in a definite full cycle position to insure that the notch of the gear 49 or 50 which is not engaged by the slidable key 51 will be aligned therewith at the end of a shift operation so that the key may be shifted freely. For this purpose, a centralizer cam 55a (Figures 2 and 5) is secured to the jack shaft 1331 and is engaged by cam follower 56 freely pivoted on a shaft 431. A spring 58 tensioned between the cam follower 56 and the machine frame urges the follower into engagement with the cam 55a so as to tend to hold the carriage shifting mechanism in a centralized full cycle position.

*Control of carriage shifting mechanism by tabulator key*

As was described hereinbefore, a master tabulator key 220 (Figures 1 and 6) is provided to initiate a carriage shift in one direction, and means under control thereof are provided to maintain the carriage shifting mechanism in operation until an end position is reached or until the shifting operation is interrupted by one of a series of settable stops on the carriage as will be described hereinafter. In the illustrated embodiment of the present invention the tabulator key 220, when depressed, always initiates operation of the carriage in one direction, namely, to the right so as to return the carriage to a starting position after the same has been automatically shifted to the left during automatic multiplication or division operations.

The key 220 is guided over a shaft 222 and is pivoted at 227 to a tabulator bail 237, pivoted on a shaft 230. The bail 237 has a camming arm 238 formed thereon and adapted, upon depression of the tabulator key 220 against the urge of a tension spring 221, to engage a pin 241 on a lever 242 pivoted on a shaft 236 and rock the same counter-clockwise against the action of a spring 242' which normally holds the lever 242 against a fixed limit pin 239.

Pivotally mounted on the lever 242 by means of a stud 233 is a trigger 243 urged clockwise relative to the lever 242 by a torsion spring 234. A shoulder is formed on the underside of the trigger 243 and this shoulder is adapted to engage an ear 244 on a latch 240. Latch 240 is pivoted on a shaft 285 and is normally urged clockwise by a tension spring 240' extending between a starting lever 252 and the latch 240 so as to hold a shoulder on the bottom edge of the latch in latching engagement with an ear 245 on a link 247 of a toggle link arrangement comprising links 247 and 248. Link 248 has an elongated slot at the upper end thereof which embraces a pin 251 fixed on the starting lever 252, while the link 247 is pivoted on a fixed stud 246 and is pivotally connected to the link 248 by a pin 249. The lever 252 is pivoted to a fixed stud 253 and is urged downwardly by a powerful spring 254 tensioned between the starting lever and the machine frame.

When the links 247 and 248 are held latched by the latch 240, the axis of pin 249 is slightly to the right (as viewed in Figure 6) of a line passing through the axes of the pin 251 and stud 246 so that whenever the lever 242 is rocked counter-clockwise and the trigger 243 is raised, the shoulder on the trigger will engage the ear 244, and rock the latch 240 counter-clockwise against the action of the relatively weak spring 240', to enable the spring 254 to rock the starting lever 252 downwardly, collapsing the toggle arrangement.

Pivoted to a depending arm of the starting lever 252 by a pin 293 is a tee member 1292.

Figures 4, 5:
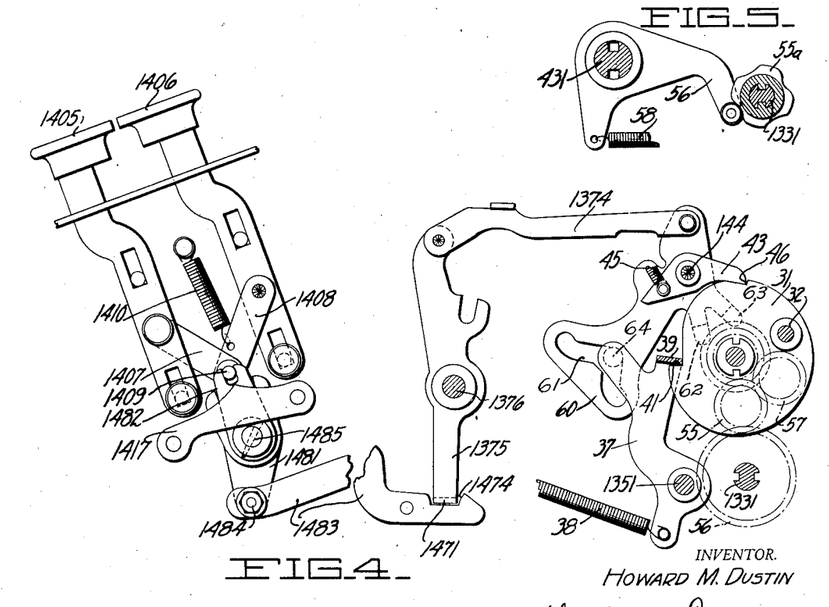
Figure 4 is a side elevational view of the reversible carriage shifting mechanism and the controls therefor.
Figure 5 is a sectional view of the centralizer device for the carriage shifting mechanism and is taken along the line 5—5 of Figure 2.
Figures 6, 7, 8:
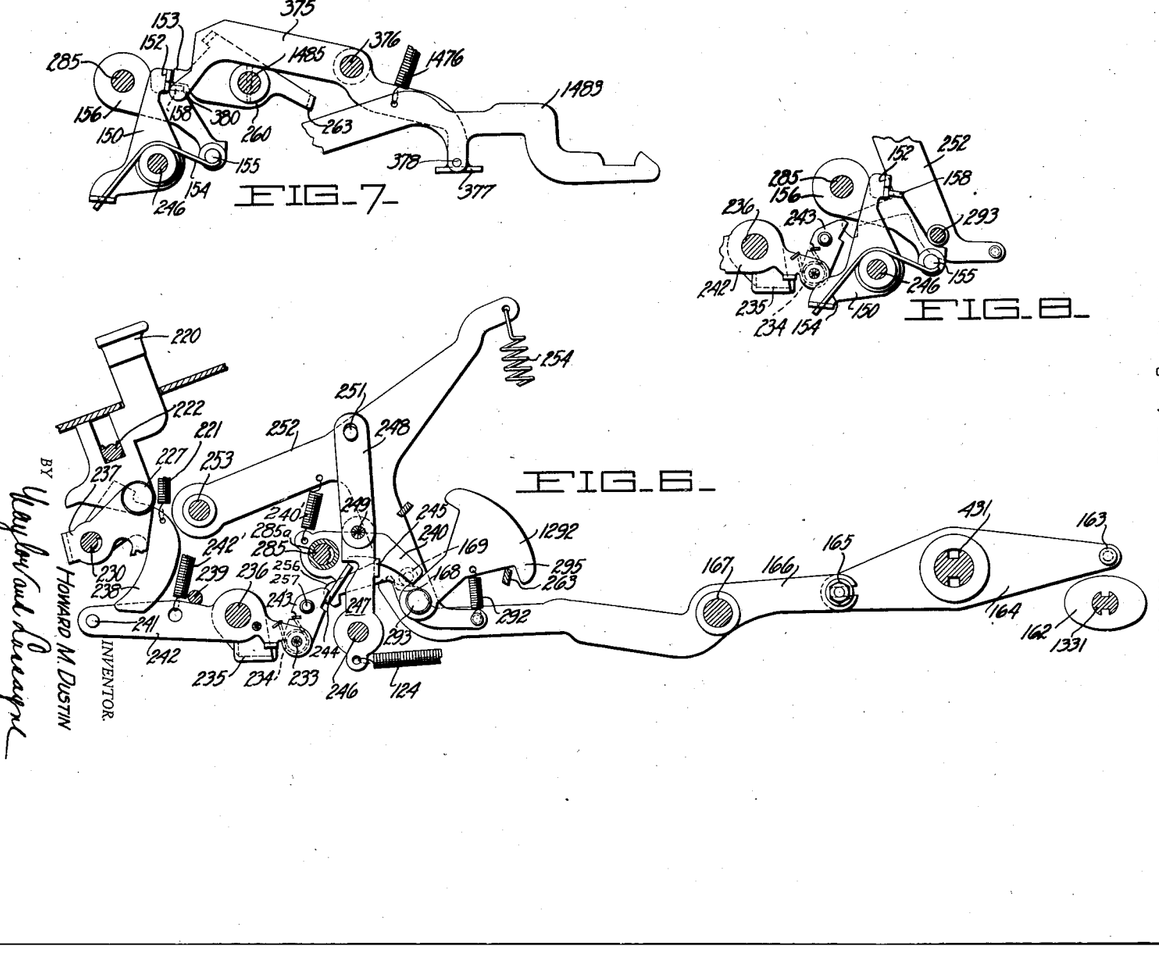
Figure 6 is a side view, in section, of the master shift initiating key and controls operated thereby, and the means for recocking such controls.
Figure 7 is a side view, in section, of the latch means for maintaining the carriage shifting mechanism in operation until the desired carriage position is reached, and the means for releasing this latch mechanism.
Figure 8 is a detailed side view of the latch means of Figure 7, showing the means for releasing the same into operation.

A spring 292 tensioned between the tee member 1292 and a stud fixed on an extension of the starting member 252 normally holds the tee member in the position illustrated in Figure 6 with an arm 295 thereon overlying an ear 263 (see also Figure 7) of a carriage shift controlling member 260, which is secured on the hereinbefore mentioned shift controlling shaft 1485 (see also Figure 4). For the purpose of the present invention, the tee member 1292 may be considered as always positioned over the ear 263 by means of the springs 292 and therefore as the starting lever 252 moves downward upon being tripped, the tee member 1292 will rock the member 260 and shaft 1485 clockwise and effect a carriage shift to the right. Shaft 1485 and its integral member 260 are thus rocked clockwise from a neutral position to right shift initiating position in response to depression of the tab key 220, and are rocked clockwise or counter-clockwise from said neutral position by the respective shift keys 1405 or 1406 to cause engagement of the shift clutch for right or left carriage shifting operation. Shaft 1485 and/or its integral member 260 thus constitute an operating member movable from an ineffective position to an effective position to initiate a carriage shifting operation.

Upon release of the master key 220 by the operator, the levers 242 and 243 assume their normal illustrated position under the urge of spring 242'. However, mechanism is provided to cause the carriage to continue its rightward shifting movement until an end position is reached or until such mechanism is tripped by one of the selectively settable stop members on the carriage as will be described hereinafter. To this end, a latch member 150 (Figs. 7 and 8) is provided to latch the shift control lever 260 in shift controlling position. The member 150 is rockably mounted on the shaft 246 and has a latching ear 152 thereon adapted to engage the bottom surface of a projection 153 on the lever 260 when the same is rocked by the tee member 1292.

A torsion spring 154 is provided to urge the latching member 150 toward latching engagement with the projection 153 of the member 260. The spring 154 extends between a lug on the latch member 150 and a roller 155 provided on the lower end of a lever 156 rockably mounted on the shaft 285. While the starting lever 252 is above its lowermost position, the lever 156 is held in a raised position, as illustrated in Figures 7 and 8, by the spring 154, in which position a lug 158 formed thereon is positioned so as to block movement of the ear 152 on latch member 150, thereby preventing engagement of the ear 152 with the projection 153 on lever 260.

As the starting lever 252 moves downwardly after being tripped by the key 220, an enlarged portion of the pivot pin 293 (Figure 8) engages the lower end of the lever 156 and rocks this lever clockwise to remove the ear 158 from blocking engagement with the member 150. This rocking movement of lever 156 also serves to further tension the torsion spring 154 and enables it to easily move the member 150 into latching relation with the projection 153.

The starting lever 252 is automatically recocked to its illustrated position during the first shift cycle, and for this purpose, levers are provided which are operated by a cam 162 (Figures 2 and 6) secured to the shift drive shaft 1331. As the cam 162 is rotated during a shift cycle, it engages a cam follower roller 163 mounted on a lever 164 to rock this lever counter-clockwise about the shaft 431 and transmit a rocking movement to a second lever 166 through a pin and slot connection 165. The lever 166 is pivotally supported on a fixed rod 167 and has a camming edge 168 formed at its leftmost end which is adapted to engage a roller 169 riveted to the lower end of the starting lever 252, to thereby raise this lever upwardly an amount sufficient to permit the toggle links 247 and 248 to be returned to their illustrated positions by a tension spring 124 extending between the link 247 and the machine frame; movement of the toggle knee 249 to dead center position being prevented by a sleeve 285a on shaft 285.

*Carriage shift terminating mechanism*

After movement of the carriage 250 toward the right has been initiated by depression of the key 220, or by depressing and holding the "right" shift key 1405 depressed, the carriage will continue shifting until it either reaches the rightmost end position or until it reaches a position indicated by a set one of a series of ordinally spaced carriage stop members 360' and 360 (Figures 1, 10, and 11) carried by the carriage, at which time operation of the shift mechanism will be interrupted. Also, upon depressing and holding the "left" shift key 1406 depressed, the carriage will continue to shift to the left until it reaches its leftmost position.

Describing first the means for arresting the carriage shift as the carriage reaches either of its end positions, it will be noted that the shift rack 355 (Figure 2) is provided with teeth corresponding in number to the number of carriage positions and has provided on either end thereof upwardly inclined deflector lugs 361 and 362. As the carriage approaches one of its end positions under power of the carriage shifting mechanism, one or the other of the lugs 361 and 362, depending upon the direction of carriage travel, will be moved to a position underlying, but not quite touching, a bail 363 (Figures 2 and 9) keyed on a rockable shaft 364 journaled in bearings provided in frame plates 365a and 365b. After the carriage has reached its end position, continued rotation of the shaft 334 will cause one of the three rollers 1357 to underride the juxtaposed deflector lug 361 or 362 and thereby cam the rack 355 upward about its hereinbefore mentioned pivot 341 (Figure 9), thus disengaging the rack from mesh with the rollers 1357. This rocking movement will also cause the lug 361 or 362 to engage the bail 363, rocking both the bail and the shaft 364.

A depending arm 365 (Figure 9) is formed integrally with the bail 363 and has an ear 366 embraced by the bifurcated end of a bell crank 367 pivoted on a frame stud 368 and normally urged in a clockwise direction against a pin 369 by a tension spring 370 extending between the machine frame and the bell crank 367. The forwardly extending arm of the bell crank 367 has an ear 371 thereon which overlies a pin 372 mounted on the hereinbefore mentioned shift operating link 1483. Therefore, as the bail 363 is rocked upwardly by the camming action of one of the rollers 1357 upon the shift rack 355, the bell crank 367 will be rocked counter-clockwise to dip the link 1483 about its pivotal connection 1484 with the arm 1481, and against the action of the spring 1476, until the notch 1474 formed thereon no longer embraces the ear 1471 of the lever 1375 (Figures 4 and 9).

However, even after the shift control mechanism has thus been released from control by the link 1483, the shift clutch 10 (Figure 3) will continue operation until the end of the current shift cycle, at which time the clutch control dog 37 will be allowed to rock clockwise to disengage the dog 33 and interrupt operation of the shift mechanism. Therefore, the rollers 1357 will be revolved to such a position that one of them will again be aligned with a tooth space in the rack 355, allowing the rack to be moved by spring 357 into meshing engagement with the roller. Also, at this time, the stud 64 (Figure 4) on the control dog 37 will cam the member 60, link 1374, and lever 1375, into their illustrative centralized position permitting spring 1476 to reengage notch 1474 with ear 1471 as soon as link 1483 is permitted to return to normal position.

The above described mechanism for terminating operation of the shift mechanism as the carriage reaches an end position is disclosed and claimed in the Avery Patent Number 2,376,954 issued May 29, 1945.

Means are provided for releasing the latch 150 (Figure 7) during the last or idle shift cycle so as to enable the shift control link 1483 to be centralized in the event that a shift has been initiated by the key 220. For this purpose, a lever 375, pivoted on a bearing pin 376, is provided. A lug 377 on the lower end of the lever 375 underlies a pin 378 on the link 1483 so that as this link is rocked downwardly by the bell crank 367 during the last shift cycle, the lever 375 will be rocked clockwise, and a camming nose 380 formed thereon will engage the latching ear 152 of latch 150 to rock the latter counter-clockwise away from latching engagement with the projection 153 on the shift controlling lever 260, enabling this lever to be centralized by the tension spring 1410 (Figure 4) so as to rock the shaft 1485 and position the notch 1474 of the link 1483 in embracement with the ear 1471 of the now centralized shift controlling lever 1375 in readiness for a new shift controlling movement.

As the latch member 150 is rocked counter-clockwise by the camming nose 380 of lever 375, the ear 152 will pass from over the ear 158 of the lever 156, enabling the torsion spring 154 to rock lever 156 upwardly an amount sufficient to cause the ear 158 to hold the latch member 150 in its illustrated unlatched position.

Mechanism is provided to disable the interponent 243 (Fig. 6) and hold the same out of effective position in case the operator should hold the key in depressed position after the carriage has reached a tabulated position or an end position. By means of such mechanism, the shift clutch may be disengaged at the proper time and the starting lever 252 will not maintain the shift clutch in engagement beyond the proper time for disengagement when the key 220 is held depressed. As described hereinbefore the starting lever 252 is returned to the normal position shown in Fig. 6 by the shift drive train and the latch 240 latches the toggle 247—248 which in turn holds the starting lever in its normal position.

When the key 220 is depressed the interponent 243 is raised to trip the latch 240 as described hereinbefore, and in such position the interponent would hold the latch out of latching position if means were not otherwise provided to prevent the interponent from doing so. The starting arm 252 is therefore provided with a leftwardly extending nose 256 (Fig. 6) which upon movement thereof with the starting arm, engages the far end of a stud 257 to rock the interponent toward the left about its pivot stud 233 and hold the same out of the path of the ear 244, so that the latch 240 will be able to return to its latching position when the toggle is recocked even though the key 220 is held depressed.

When the key is released by the operator and rises under spring tension, the interponent 243 slides down along the side of ear 244 and then snaps underneath the same to re-establish the operative connection between key 220 and latch 240. The interponent 243 thus constitutes a member which is operable in response to the depression of the key 220 to disable the operative connection between the key and the shift control train to thereby permit the latching of the starting member and to thus permit the disengagement of the shift clutch while the key 220 is held depressed.

Since there are two shift initiating key mechanisms; namely, the tabulator key 220 and related mechanism described above and the shift keys 1405 and 1406, there is provided a second member 1483 described in detail hereinbefore which is operable to initiate and maintain operation of the shifting mechanism and which is also capable of being disabled in a manner described hereinbefore. Member 1483 thus constitutes an element which is adjustable to render the shift control train ineffective to initiate and maintain operation of the shifting mechanism.

*Tabulation control*

As mentioned heretofore, ordinally settable stop members 360' and 360 (Figures 1, 10, and 11) are provided to enable the carriage to be arrested in different positions during a rightward shift effected either by the master tabulator key 220 or by the shift key 1405.

Referring to Figures 10 and 11, each stop member comprises a stem 380 having elongated slots formed therein and embracing rods 1867 and 1878 supported by the carriage frame. Normally each of the stop members is held in its illustrated position by a tension spring 381 extending between the stem 380 and the carriage frame, in which case, the tail 382 of the stem is so positioned as to be incapable of engaging an interponent 383 (Figures 2 and 10) hereinafter described. However, upon depression of a button 384 secured to the upper end of the stem 380 and protruding through the carriage cover, the stem may be moved downward to a position wherein a lug 385 formed thereon is latched by a bail 386 pivoted on the rod 1878 and urged downwardly by a tension spring 387. When in this latter position, the tail 382 is located in a position in which it is adapted to engage the interponent 383 as the carriage is shifted.

The interponent 383 is pivoted at 390 to an ear 391' of an arm 391, keyed on the shift terminating shaft 364, adjacent the left hand carriage frame plate 365a. The interponent 383 has an ear 392 which is normally held in engagement with a mating inclined edge, formed on the ear 391', by a spring 393 tensioned between the ear and a part of the machine framework. It will be noted, however, that the spring 393 is much weaker than the spring 370 (Figure 9) and will, therefore, not affect operation of this latter spring.

In the event that a stop member 360 to the left of the interponent 383 has been depressed to set position, wherein the tail 382 of the corresponding stem 380 is located in a position indicated by the dot and dash lines 382' (Figure 10) and the carriage is shifted to the right under power, the tail 382 will strike the inclined projection 395 (Figure 2) of the interponent 383 during the shift cycle in which the carriage is being shifted to a position corresponding to the numerical indication of the depressed button 384, and will cam the interponent and consequently the arm 391 and shaft 364 clockwise (as viewed in Figure 9) against the action of the normalizing spring 370, thereby interrupting operation of the shift mechanism in the same manner as described in detail in the preceding section.

Since the carriage continues on until it reaches an operating position as described hereinabove, the interponent 383, arm 391, shaft 364, and other parts of the shift terminating mechanism will be allowed to resume their normal illustrated positions. Therefore, if the key 220 or the shift key 1405 is again depressed, the carriage will continue to shift to the right until it is arrested in a position corresponding to the numerical indication of a second depressed stop member 360 if two or more stop members 360 have been concurrently set, or the carriage will continue to the rightmost end position where, as described hereinbefore, the rack 355 will be cammed upward by one of the rollers 1357 and the shift terminating mechanism brought into effect.

If, however, the carriage is shifted to the left, as by depression of the "left" shift key 1406, and the tail 382 of a stop member located in set position, strikes the interponent 383, the interponent will merely rock about its pivot 390 against the urge of its relatively weak spring 393 and thus allow the tail 382 to pass by without rocking the arm 391 to interrupt the shift operation. The interponent 383 thus constitutes an element yieldable in response to movement of the carriage in the opposite direction to render the carriage position device ineffective to actuate the shift terminating mechanism.

If it is desired to set a new stop member 360, the corresponding button 384 is depressed, causing its lug 385 to first cam the locking bail 386 upward to release any previously set stop members, and then allow the bail to snap behind the depressed lug locking the same in set position. Two or more members may be set at the same time by concurrently depressing the corresponding buttons 384, or all stop members may be released from set position by depressing the leftmost stop member 360' (Figure 11), the lug 385 of which engages an extending ear 386a of the locking bail 386 to cam the bail upwardly into releasing position. However, the ear 386a is incapable of latching the stop member 360' in depressed position and therefore, the member 360', which is located in a position in which it would cause the termination of the carriage shift when the carriage reaches its rightmost end position, acts merely as a release member for the other stop members.

Only five stop members have been illustrated in connection with the eight bank machine in which the present invention is embodied, thereby enabling the carriage to be automatically stopped in any of the five rightmost carriage positions indicated by the numerals "4" to "8" on a strip 1875 (Figure 1) secured to the cover of the carriage 250, which numerals are pointed off by an arrow 333 on the cover of the machine. However, a greater or less number of stop members may be provided as desired.

Specific examples of the operation of the tabular stop mechanism in conjunction with calculations performed by the machine will clearly illustrate the advantages of the present invention.

If, for example, in office routine calculations, an operator makes a series of calculations of the same type, such as multiplication, in which the multipliers range from two to five digits, the operator may latch down the number "4" stop member 350 which is just to the high of the mean between the two and five digit multipliers just mentioned, thereby effecting return of the carriage to the number "4" position after each calculation by the depression of the key 220. If the multiplier of an example is a three digit number instead of a four digit number, for example, 725, the operator may (after depressing the key 220) either momentarily depress the "left" shift key 1406, or he may depress the zero multiplier key 2001, thereby shifting the carriage one order to the left, as is described in detail in the above mentioned Avery Patent Number 2,216,659, before the multiplication operation functions. If the next problem, however, has a five digit multiplier, the operator may (after depressing the key 220) make a short depression of the "right" shift key 1405 and then begin the multiplication, or he may have previously set the "5" stop member concurrently with the "4" stop member, in which case, he will merely again depress the key 220, the carriage shifting the extra step to the right to accommodate the five digit multiplier.

If it is desired at times to shift the carriage to its rightmost position previous to the start of a calculation, the number "8" stop member may be depressed, releasing any other depressed stop member and permitting an uninterrupted rightward carriage shift.

The shift initiating lever 242 (Figure 6) may, in lieu of being manually rocked by depression of the master shift initiating key 220, be automatically rocked at the end of a division performance, thereby relieving the operator of the necessity of manually initiating the shift. Mechanism for accomplishing this result is disclosed and claimed in the Dustin et al. Patent Number 2,377,767, issued June 5, 1945. Since the connection between such automatic mechanism and the lever 242 is clearly disclosed in said patent it is not believed necessary to show the same herein.

Also, means may be provided to rock the shift initiating lever 242 to initiate a carriage shift upon entry of a factor in the keyboard. Such means is disclosed and claimed in the Avery Patent Number 2,294,948 issued September 8, 1942. In this case, a bail 235 (Figure 6) similar in function and structure to the correspondingly numbered bail in the last mentioned patent is suitably secured to the lever 242 and is thereby rocked to initiate a carriage shifting operation upon depression of a value key 100 (Figure 1) incident to setting up a factor of a new calculation on the keyboard.

I claim:

1. In a calculating machine comprising a frame having a carriage transversely shiftable thereon into a plurality of operating positions, reversible cyclically operable shifting mechanism for shifting said carriage in either of two opposite directions, a shift control train movable to operative position to initiate and maintain operation of the shifting mechanism, said control train comprising an element adjustable to render the train ineffective to initiate and maintain operation of the shifting mechanism; the combination of, a shift key depressible to control movement of said train to operative position and effective when manually held depressed to maintain said train in operative position for causing a plural cycle operation of said shifting mechanism, a second shift key depressible to control movement of said train to operative position, and latching means operable under control of said second shift key to maintain said train in operative position for plural cycle operation of said shifting mechanism, with; shift terminating mechanism for terminating operation of the shifting mechanism including, means for adjusting the aforesaid element of said shift control train to render said train ineffective to maintain operation of the shifting mechanism, and means for rendering said latching means ineffective to maintain said train in operative position; and a carriage position device responsive to movement of said carriage in one direction to a predetermined position to actuate said shift terminating mechanism, said device including an element yieldable in response to movement of the carriage in the opposite direction through said predetermined position to render said device ineffective to actuate the shift terminating mechanism.

2. In a calculating machine comprising a frame having a carriage transversely shiftable thereon into a plurality of operating positions, cyclically operable shifting mechanism for said carriage, and a shift control train movable to operative position to initiate and maintain operation of said shifting mechanism, said control train comprising an element adjustable to render the same ineffective to initiate and maintain operation of the shifting mechanism; the combination of, a shift key depressible to control movement of said train to operative position to effect a plural cycle operation of said shifting mechanism by manually holding the shift key depressed, a second shift key depressible to control movement of said train to operative position, and latching means operable under control of said second key to maintain said train in operative position for a plurality of cycles of operation of said shifting mechanism, with a carriage position device responsive to movement of said carriage to any one of a series of operating positions including means for adjusting the aforesaid element of said shift control train to render said train ineffective to maintain operation of the shifting mechanism and means for rendering said latching means ineffective to maintain said train in operative position.

3. In a calculating machine comprising a frame having a carriage transversely shiftable thereon to a plurality of operating positions, reversible cyclically operable shifting mechanism for shifting said carriage in either of two opposite directions, a shift control train movable to operative position to control operation of said shifting mechanism; said control train being adapted to be disabled and reenabled; the combination of, a shift key depressible to control movement of said train to operative position and effective when manually held depressed to maintain said train in operative position for causing a plural cycle operation of said shifting mechanism, a second shift key depressible to control movement of said train to operative position, and latching means operable under control of said second shift key to maintain said train in operative position for a plural cycle operation of said shifting mechanism, with, a plurality of carriage position devices selectively settable to correspond respectively to said plurality of positions of said carriage, shift terminating mechanism actuated by the set one of said devices in response to carriage shifting movement approaching immediately adjacent the position corresponding to the selected device, means operable by said shift terminating mechanism to disable said shift control train, and means operable by said shift terminating mechanism to unlatch said latching means, said shift terminating mechanism including an element yieldable upon movement of said carriage in one direction to disable said shift terminating mechanism.

4. In a calculating machine comprising a frame having a transversely shiftable carriage thereon; mechanism for shifting said carriage to any of a series of positions; a series of selectively settable elements on said carriage each corresponding to a respective one of said series of positions of said carriage; a shift control member movable from ineffective position to shift initiating position to cause said shifting mechanism to shift said carriage; an operating member movable from an ineffective position to an effective position; and connecting means between the operating member and the shift control member, operable in response to movement of the operating member to effective position to move the shift control member to said shift initiating position; the combination of, shift terminating means controlled by the one of said elements which is selectively set, and operable upon carriage shifting movement approaching immediately adjacent the selected position corresponding to the element set, to disable the connecting means; with means responsive to the disablement of said connecting means to move said shift control member and said operating member to their respective ineffective positions; and means automatically operable when the carriage is in said selected position and responsive to movement of said two members to ineffective positions to reenable said connecting means.

5. In a calculating machine comprising a frame having a transversely shiftable carriage thereon; cyclically operable mechanism for shifting said carriage to any of a series of positions, a series of settable elements on said carriage each corresponding to a respective one of said series of positions of the carriage; a shift control member movable from an ineffective position to shift initiating position to cause said shifting mechanism to shift said carriage; an operating member movable from an ineffective position to an effective position; means operable to move said operating member as aforesaid, and latch means for holding said operating member in effective position, normally enabled connecting means between said operating member and said control member and operable in response to movement of the operating member to effective position to move said shift control member to shift initiating position; means controlled by a set one of said elements upon movement of said carriage to the selected position, corresponding to the element set, to disable said connecting means and to trip said latch; means responsive to such disablement of said connecting means to move said shift control member to ineffective position; means effective upon tripping of said latch for moving said operating member to ineffective position; and means automatically operable when the carriage is in said selected position and responsive to movement of said two members to ineffective positions to reenable said connecting means.

6. In a calculating machine comprising a frame having a carriage transversely shiftable thereon into any of a plurality of operating positions including two opposite end positions and a plurality of intermediate positions; reversible shifting mechanism operable cyclically to shift the carriage in either of two opposite directions from one of said positions to an adjacent one of said positions; mechanism for causing operation of said shifting mechanism including, shift initiating means manually operable to cause a plural cycle operation of the shifting mechanism in either direction, a second shift initiating means manually operable to cause a plural cycle operation of the shifting mechanism in one of said two directions, and a shift control train common to and controlled by said two shift initiating means for controlling said shifting mechanism; said shift train being adapted to be disabled and reenabled selectively; the combination of, means for preventing shifting of said carriage beyond either end position in response to operation of said first shift initiating means, said preventing means being operable in response to overdriving of said shifting mechanism with the carriage in said end position; and shift terminating means controlled by said preventing means upon overdriving of said shifting mechanism to disable said shift control train and to cause the same to terminate operation of the shifting mechanism; with selectively settable devices operable in response to operation of the shifting mechanism under control of said second shift initiating means for moving the carriage in one direction to a position corresponding to the setting of said settable means to cause said shift terminating means to terminate operation of the shifting mechanism, said shift terminating means including an element yieldable upon movement of the carriage through said position in the opposite direction to render said settable devices ineffective to cause termination of the operation of the shifting mechanism as aforesaid.

7. In a motor driven calculating machine having a carriage shiftable to any of a series of operating positions, carriage shifting means operable by the motor to shift the carriage in either direction to any of said positions including a cyclic clutch, and yieldable elements between said clutch and the carriage adapted to prevent shifting of the carriage beyond either end position upon overdriving of said shifting means; a control element for said clutch, a pair of directional shift keys for controlling said shifting means, a shift operation control train common to both of said keys, operable by either of said keys to move the clutch control element to drive transmitting position, and including a member adjustable to disable said train and thus permit movement of said element from said position while the operated key is held depressed, and means responsive to either such adjustment of said member or return of an operated key for disengaging the clutch at the conclusion of its current cycle; the combination with tripping means operable in response to yielding of a yieldable element to adjust said member as aforesaid and means responsive to return of a depressed key for readjusting said member to normal position to reenable said common control train, of a series of settable elements mounted on said carrriage at intervals corresponding to the intervals between operating positions of said carriage, and means controlled by any set one of said series of elements and operable by said carriage shifting means for operating said tripping means; whereby said carriage may be selectively positioned in any of a series of said operating positions.

8. In a motor driven calculating machine having a carriage shiftable to any of a series of operating positions, carriage shifting means operable by the motor to shift the carriage in either direction to any of said positions including a cyclic clutch, and yieldable elements between said clutch and the carriage adapted to prevent shifting of the carriage beyond either end position upon overdriving of said shifting means; a control element for said clutch, a shift key for controlling said shifting means, a shift operation control train operable by said key to move the clutch control element to drive transmitting position and including a member adjustable to disable said train and thus permit movement of said element from said position while said key is held depressed, and means responsive to either such adjustment of said member or return of the key from operated position for disengaging the clutch at the conclusion of its current cycle; the combination with tripping means operable in response to yielding of a yieldable element to adjust said member as aforesaid, of a series of settable elements mounted on said carriage at intervals corresponding to the intervals between operating positions of said carriage, and means controlled by any set one of said series of elements and operable by said carriage shifting means for operating said tripping means; whereby said carriage may be selectively positioned in any of a series of said operating positions.

9. In a motor driven calculating machine having a carriage shiftable to any of a series of operating positions, carriage shifting means operable by the motor to shift the carriage in either direction to any of said positions including a cyclic clutch, and yieldable elements between said clutch and the carriage adapted to prevent shifting of the carriage beyond either end position upon overdriving of said shifting means; a control element for said clutch, a shift key for controlling said shifting means, a shift operation control train operable by power derived from the motor and responsive to said key upon depression thereof to move the clutch control element to drive transmitting position, latching means for maintaining said train in drive transmitting position, and means responsive to release of said latching means for disengaging the clutch at the conclusion of its current cycle; the combination with tripping means operable in response to yielding of a yieldable element to release said latching means, of a series of settable elements mounted on said carriage at intervals corresponding to the intervals between operating positions of said carriage, and means controlled by any set one of said series of elements and operable by said carriage shifting means for operating said tripping means; whereby said carriage may be selectively positioned in any of a series of said operating positions.

10. The combination defined by claim 7 in which the means controlled by any set one of said series of elements includes a yieldable member adapted to prevent operating of the tripping means by the carriage shifting means during movement of the carriage in one direction only.

11. The combination defined by claim 8 in which the means controlled by any set one of said series of elements includes a yieldable member adapted to prevent operating of the tripping means by the carriage shifting means during movement of the carriage in one direction only.

12. The combination defined by claim 9 in which the means controlled by any set one of said series of elements includes a yieldable member adapted to prevent operating of the tripping means by the carriage shifting means during movement of the carriage in one direction only.

13. In a motor driven calculating machine having a carriage shiftable to any of a series of operating positions, carriage shifting mechanism including a motor driven clutch capable of engagement and disengagement to thereby shift the carriage and to cause the same to stop in any one of said positions, a series of settable elements each corresponding to a respective one of said positions of the carriage, means for retaining any one or more of said elements in set position, a shift initiating key, and shift initiating mechanism operable in response to depression of said key with the carriage in a position corresponding to any one of said set elements to effect engagement of the clutch for shifting the carriage to the position corresponding to the next set one of said elements; the combination of shift terminating mechanism comprising, a device controlled by said next element and operable in response to movement of said carriage into the proximity of the position corresponding to said next element to cause disengagement of the shift clutch in such timed relation to the movement of the carriage as to bring the carriage to rest in the last mentioned position, including a member operable to render the shift initiating mechanism non-responsive to depression of said key, and means responsive to completion of the operation of said shift terminating mechanism and return of said shift initiating key from depressed position for again rendering said shift initiating mechanism operable in response to depression of said shift initiating key as aforesaid.

14. In a motor driven calculating machine having a carriage shiftable to any of a series of operating positions, carriage shifting mechanism including a motor driven clutch, a series of settable elements each corresponding to a respective one of said positions of the carriage, means for retaining any one or more of said elements in set position, a shift control train operable to cause engagement or disengagement of said clutch to thereby shift the carriage and to stop the same in any of said positions, a shift initiating key depressible to cause a clutch engaging operation of said shift control train, and an interponent in said train movable from a first position in which it conditions said train for causing engagement of said clutch as aforesaid to a second position in which it conditions said train for causing disengagement of said clutch; the combination of shift terminating mechanism controlled by the first one of said set elements and operable in response to carriage shifting movement approaching immediately adjacent the operating position which corresponds to said first element to move said interponent to its second position, with means responsive jointly to return of said shift initiating key from depressed position and to completion of the operation of said shift terminating mechanism for causing return of said interponent to its first position.

15. In a motor driven calculating machine having a carriage shiftable to any of a series of operating positions, carriage shifting mechanism including a motor driven clutch operable upon engagement thereof to shift the carriage, a series of settable elements each corresponding to a respective one of said positions of the carriage, means for retaining any one or more of said elements in set position, a shift control train movable from a normal position to a shift initiating position to cause engagement of the clutch as aforesaid, a shift initiating key, and an operative connection between the key and the control train and effective upon depression of the key to actuate said train to shift initiating position; the combination of a latch operable upon said actuation of said train to retain the train in shift initiating position, with shift terminating mechanism controlled by the first one of said set elements and operable in response to carriage shifting movement approaching immediately adjacent the operating position which corresponds to said first element to trip said latch, spring means responsive to tripping of said latch for returning said control train to the normal position thereof in which it causes disengagement of said clutch, a member operable in response to depression of said key to disable said operative connection and thereby to permit such clutch disengagement while the key is held depressed, and means responsive to return of the key from depressed position to reenable the operative connection between the key and shift control train.

HOWARD M. DUSTIN.

REFERENCES CITED

The following references are of record in the file of this patent:

UNITED STATES PATENTS

| Number | Name | Date |
|---|---|---|
| 1,967,437 | Hart | July 24, 1934 |
| 1,974,494 | Kottmann | Sept. 25, 1934 |
| 2,211,736 | Avery | Aug. 13, 1940 |
| 2,252,621 | Eichler | Aug. 12, 1941 |
| 1,292,513 | Rechnitzer | Jan. 28, 1919 |
| 1,526,310 | Barney | Feb. 17, 1925 |
| 1,572,396 | Kurowski | Feb. 9, 1926 |
| 2,079,605 | Dodson | May 11, 1937 |
| 2,157,459 | Pott | May 9, 1939 |
| 2,082,098 | Christian | June 1, 1937 |
| 2,162,238 | Avery et al. | June 13, 1939 |
| 2,294,948 | Avery | Sept. 8, 1942 |
| 2,327,635 | Friden | Aug. 24, 1943 |
| 2,335,282 | Jessup et al. | Nov. 30, 1943 |
| 2,310,281 | Friden | Feb. 9, 1943 |